Dec. 21, 1954 J. STONE 2,697,813

MAGNETIC AMPLIFIER SYSTEM

Filed April 12, 1951 3 Sheets-Sheet 1

INVENTOR.
JOHN STONE.
BY Ward, Crosby & Neal
ATTORNEYS.

MAGNETIC AMPLIFIER SYSTEM

Filed April 12, 1951 3 Sheets-Sheet 2

INVENTOR.
JOHN STONE.
BY Ward, Crosby & Neal
ATTORNEYS.

Dec. 21, 1954 J. STONE 2,697,813

MAGNETIC AMPLIFIER SYSTEM

Filed April 12, 1951 3 Sheets-Sheet 3

INVENTOR.
JOHN STONE.
BY Ward, Crosby & Neal
ATTORNEYS.

2,697,813

MAGNETIC AMPLIFIER SYSTEM

John Stone, Havertown, Pa., assignor to Warren Webster & Company, Camden, N. J., a corporation of New Jersey Application April 12, 1951, Serial No. 220,590

15 Claims. (Cl. 323—79)

This invention relates to magnetic amplifier systems and more particularly, to systems employing variable reactance devices for amplifying electrical signals of low energy level.

Variable reactance devices which will produce relatively large changes in output power for small changes in input power are well known, but such devices have the disadvantage that the output current when the input or control power is zero is relatively large. Furthermore, the range of amplification, i. e., the difference between the minimum output current and the maximum output current at which useful amplification can still be obtained, is not as great as is desired in many applications.

United States Patent No. 2,461,046 discloses a magnetic amplifier system which produces a relatively large change in output power with small changes in input power, and the system disclosed therein produces such amplification without the first of the above-mentioned disadvantages. The reduction in output or load current when the input power is zero is obtained by the use of a transformer, one winding of which is connected in a bridge circuit with a pair of impedances and a variable reactance device.

The present invention is an improvement over the system described in Patent No. 2,461,046 in that it not only uses fewer components but also it provides a greater range of amplification and in the preferred form, it provides greater amplification for given changes in input power. These advantages are obtained without requiring an increase in the load or output current of the amplifier when the input or control power is substantially zero.

Because of the increased amplification and the increased amplification range obtained with my invention, it is possible to construct a much more sensitive amplifier than heretofore possible with a given number of stages or if desired, the same sensitivity can be obtained with fewer stages resulting in a saving in weight, space and cost of construction.

Accordingly, it is an object of my invention to provide a magnetic amplifier system which is simple and which is economical to manufacture.

It is a further object of my invention to provide a magnetic amplifier system which has a high gain and which has a large output current range, the high gain being obtainable over the entire range.

Other objects and advantages of the invention will be apparent from the description of specific embodiments of the invention given hereinafter by way of example only and setting forth the manner in which I now prefer to practice the invention.

In accordance with one embodiment of my invention, a load circuit is connected in series with a variable impedance, such as a variable reactance, across an alternating current source. The load circuit is shunted by a non-linear impedance, such as a non-linear reactance, whose impedance increases with voltage. Thus, when the variable reactance has a high value, most of the current flowing through the reactance also flows through the non-linear impedance producing a small value of load current. When the variable reactance has a low value, the voltage across the load circuit is high, and hence, both the non-linear impedance and the load current have high values.

In the preferred embodiment of my invention, a saturable core device having a plurality of direct current saturating windings and an alternating current reactance winding is connected with the reactance winding in series with the primary winding of a transformer across an alternating current source. The load circuit which includes a rectifier is connected in series with the secondary winding of the transformer, and the series connected load circuit and secondary winding are connected in shunt or parallel with the primary winding of the transformer. The load circuit may also include an impedance which is connected in parallel with one of the saturating windings so as to provide positive feedback to the saturable core device.

My invention may be better understood by referring to the following detailed description of the invention and to the accompanying drawings, in which.

Figure 1:
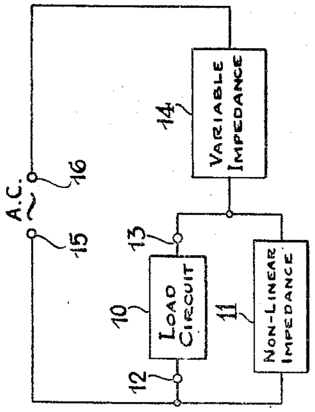
Fig. 1 is a block diagram illustrating generally the arrangement of the elements of the magnetic amplifier system of my invention.

Referring to Fig. 1, a load circuit 10 is shown connected in parallel or shunt with a non-linear impedance 11 at a pair of output terminals 12 and 13. The parallel connected load circuit 10 and the non-linear impedance 11 are connected in series with a variable impedance 14 across a pair of alternating current input terminals 15 and 16. Variation of the impedance 14 causes the voltage across the load circuit and the non-linear impedance to change in such a manner that when the variable impedance 14 has a high value, the voltage across the load circuit and the non-linear impedance has a low value. Conversely, when the variable impedance has a low value, the voltage across the load circuit and the non-linear impedance is high. Thus, by controlling the variable impedance 14, it is possible to control the voltage across the load circuit 10 and the non-linear impedance 11 and hence, to change the currents flowing through these latter two elements.

Figure 2:
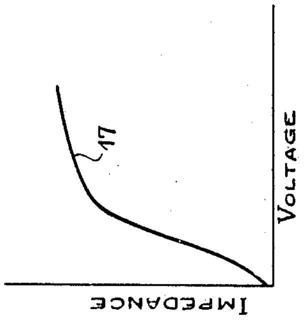
Fig. 2 is a graph illustrating the electrical characteristic of a non-linear impedance employed in the system of my invention.

The non-linear impedance 11 is one whose impedance increases with voltage applied thereto. In other words, for low values of voltage applied across the impedance 11, the value of the impedance is relatively small and for high values of voltage applied across the impedance 11, the impedance is relatively high. Curve 17 in Fig. 2 illustrates the manner in which the impedance 11 varies with voltage across the impedance. Non-linear impedances having this type of characteristic are well known and various preferred forms of non-linear impedances will be described hereinafter.

As heretofore mentioned, known types of variable impedance devices which will produce large changes of current through the impedance for small changes in power used to change the impedance do not limit the current through the impedance to a low value when the impedance has its maximum value. If, therefore, all of the current flowing through the variable impedance 14 also flows through the load circuit 10, the minimum current through the load circuit 10 will be relatively large. If the load circuit 10 is shunted by a fixed impedance, such as a linear resistor, so as to reduce the minimum current flowing through the load circuit 10, the gain of the amplifier system is reduced in proportion to the ratio of the value of the fixed impedance to the value of the load circuit impedance. The reduction in gain is in fact so great that the use of a linear impedance in shunt with the load circuit has in the past been found to be unsatisfactory.

If the load circuit 10 is shunted by a non-linear impedance 11 having the characteristic shown in Fig. 2, the value of the impedance 11 is such that when the current through the variable impedance 14 is at a minimum, a large proportion of the current flowing through the variable impedance 14 flows through the non-linear impedance 11 and a small proportion of the current flowing through the variable impedance 14 flows through the load circuit 10. However, as the value of the variable impedance 14 is decreased so that the voltage across the load circuit 10 increases, the impedance value of the non-linear impedance 11 increases and hence, the non-linear impedance 11 has flowing through it a smaller proportion of the current flowing through the variable impedance 14. In other words, as the current through the impedance 14 is increased by reducing the value of the variable impedance 14, the current through the load circuit 10 is increased not only because of the increase of the voltage across circuit 10 but also because of the decrease of the proportion of the current flowing through the non-linear impedance 11. I have found that because of this effect, the gain of the magnetic amplifier system may be made much greater than the gain of a magnetic amplifier system employing a fixed impedance in shunt with the load circuit.

Figure 3:
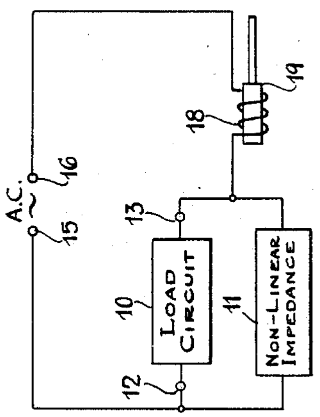
Fig. 3 is a diagram illustrating one form of variable impedance which may be used to control the output of the magnetic amplifier system.

As shown in Fig. 3, the variable impedance may be a variable reactance device having the form of a winding 18 surrounding a movable core 19, and its operation may be the same as the variable reactance device shown in Patent No. 2,461,046. For example, suppose that the core 19 has a normal position in which it is fully entrant into and embraced by the winding 18 and that when acted upon by an external force, it becomes partially retracted from the winding. When the core is in its normal position, the winding 18 will have a reactance and hence, an impedance of a predetermined value. When the core 19 is retracted, the reactance will decrease in accordance with the extent to which the core is withdrawn.

Figure 4:
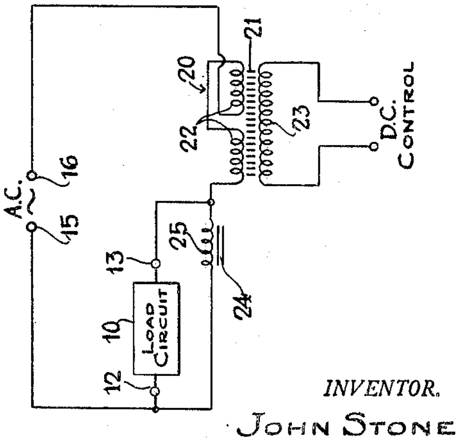
Fig. 4 is a diagram illustrating a different form of variable impedance for controlling the output current of the magnetic amplifier system and one form of non-linear impedance.

Instead of the core and winding arrangement shown in Fig. 3, a saturable reactance device of the type shown in Fig. 4 may be used as the variable impedance. In Fig. 4, a saturable reactance device 20 has a magnetic core 21, an alternating current reactance winding 22 and a direct current saturating winding 23. The structural configuration of the core 21 and the disposition thereon of the windings may be in accordance with any well known type of construction and preferably they have the configuration and disposition which will be described hereinafter in connection with Fig. 7. The saturable reactance device operates in a well known manner to change the reactance of its winding 22 when the direct current flowing in the winding 23 is varied. For example, when the direct current flowing through the winding 23 is a minimum, the winding 22 has a maximum value of reactance and when the direct current flowing through the winding 23 is a maximum, the core 21 becomes saturated and the value of the reactance of winding 22 is a minimum. Therefore, the reactance of the winding 22 may be controlled by a device, such as a thermo-couple controlled direct current bridge, which supplies a variable direct current.

As indicated in Fig. 4, the non-linear impedance may take the form of a choke 24 having a winding 25 and a magnetic core. The choke may be of any well known type whose impedance varies with the voltage across the choke and hence, the current flowing through the choke. At low values of voltage, the impedance of the choke is mainly resistive but as the voltage across the choke increases, the impedance thereof increases to a maximum. As the voltage continues to rise, the impedance of the choke begins to decrease due to saturation of the magnetic core. The choke will, therefore, have a characteristic of the form indicated in the graph of Fig. 2.

The circuit shown in Fig. 4 operates in the manner set forth in connection with Fig. 1. When the current flowing through the control or saturating winding 23 is zero, the reactance of winding 22 is a maximum and hence, the current flowing through the winding 22 is a minimum. Also, under these conditions, the voltage across the load circuit 10 is a minimum and the impedance of the choke 24 is a minimum. Therefore, a maximum proportion of the current flowing through the winding 22 will flow through the choke 24. As the current flowing in the control winding 23 is increased, the reactance of the winding 22 decreases and the voltage across the load circuit 10 increases. With an increase of the voltage across the load circuit 10, the impedance of the choke 24 increases and, hence, the current flowing through the choke 24 will be a smaller proportion of the current flowing through the winding 22.

Figure 5:
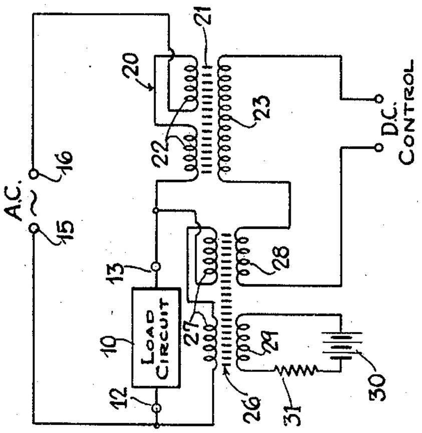
Fig. 5 is a diagram illustrating the use of an alternative form of non-linear impedance in the magnetic amplifier system.

The magnetic amplifier system shown in Fig. 5 differs from the system shown in Fig. 4 in that the non-linear choke 24 has been replaced by a saturable reactance device 26 having an alternating current reactance winding 27 and a pair of direct current saturating windings 28 and 29. The reactance device 26 is biased by means of direct current source 30 connected to winding 29 through a current adjusting resistor 31, and the current flowing through the winding 29 is adjusted so that when no current is flowing in the winding 28, the device 26 is saturated and has a minimum impedance. The magnetic flux in the core of the device 26 produced by the winding 28 is arranged to be in opposition to the magnetic flux produced in the core by the winding 29 either by oppositely winding the wire forming the windings 28 and 29 on the core or by causing the current to flow in opposite directions in the two windings.

When the control current flowing through the winding 23 of the saturable reactance device 20 is zero, the current flowing through the winding 28 of the saturable reactance device 26 is also zero. Under these conditions, the value of the reactance of the winding 22 is a maximum and the value of the reactance of the winding 27 is a minimum. Furthermore, the bias current flowing in the winding 29 and the characteristics of the device 20 are preferably so chosen that when the control current flowing through the winding 23 and hence, through the winding 28 is sufficient to produce magnetic flux in the core of the saturable reactance device 26 which is equal and opposite to the magnetic flux produced in the core of the device 26 by the winding 29, the reactance of the winding 22 is a minimum and the reactance of the winding 27 is a maximum. It is, therefore, apparent that the saturable reactance device 26 functions in the magnetic amplifier system in much the same manner as the non-linear choke 24 shown in Fig. 4.

Figure 6:
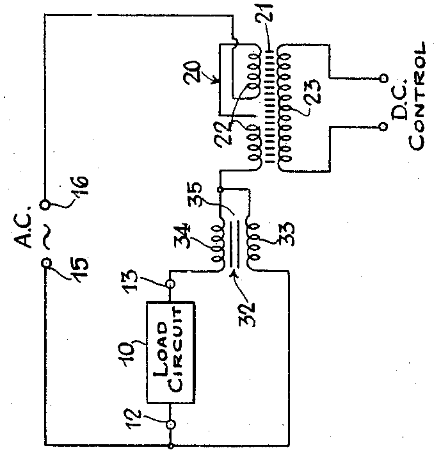
Fig. 6 is a diagram illustrating one preferred form of the magnetic amplifier system in which a transformer is employed as a non-linear impedance.

In Fig. 6, there is shown a preferred embodiment in which a transformer 32 comprising a primary winding 33, a secondary winding 34 and a core 35 takes the place of the saturable reactance device 26 and the non-linear choke 24 shown in Figs. 4 and 5, respectively. The arrangement shown in this figure is preferred, not only because of its simplicity, but also because it provides both high gain and a large amplification range without feedback. In Fig. 6, the reactance winding 22 of the saturable reactance device 20 is connected in series with the primary winding 33 across the alternating current input terminals 15 and 16. The secondary winding 34 of the transformer 32 is connected in series with the output terminal 13 and to the junction point between the reactance winding 22 and the primary winding 33. The secondary winding 34 is, therefore, in series with the load circuit 10, and the series connected load circuit 10 and the secondary winding 34 are in parallel with the primary winding 33.

The operation of the circuit shown in Fig. 6 is similar to the operation of the circuits shown in Figs. 1, 3, 4 and 5 and the primary winding 33 of the transformer 32 acts as a non-linear impedance in a manner which will be hereinafter described in detail. When the voltage across the primary winding 33 is varied from a minimum to a maximum by means of the saturable reactance device 20, the impedance of the primary winding 33 changes from a small value to a relatively large value.

Figures 7, 9:
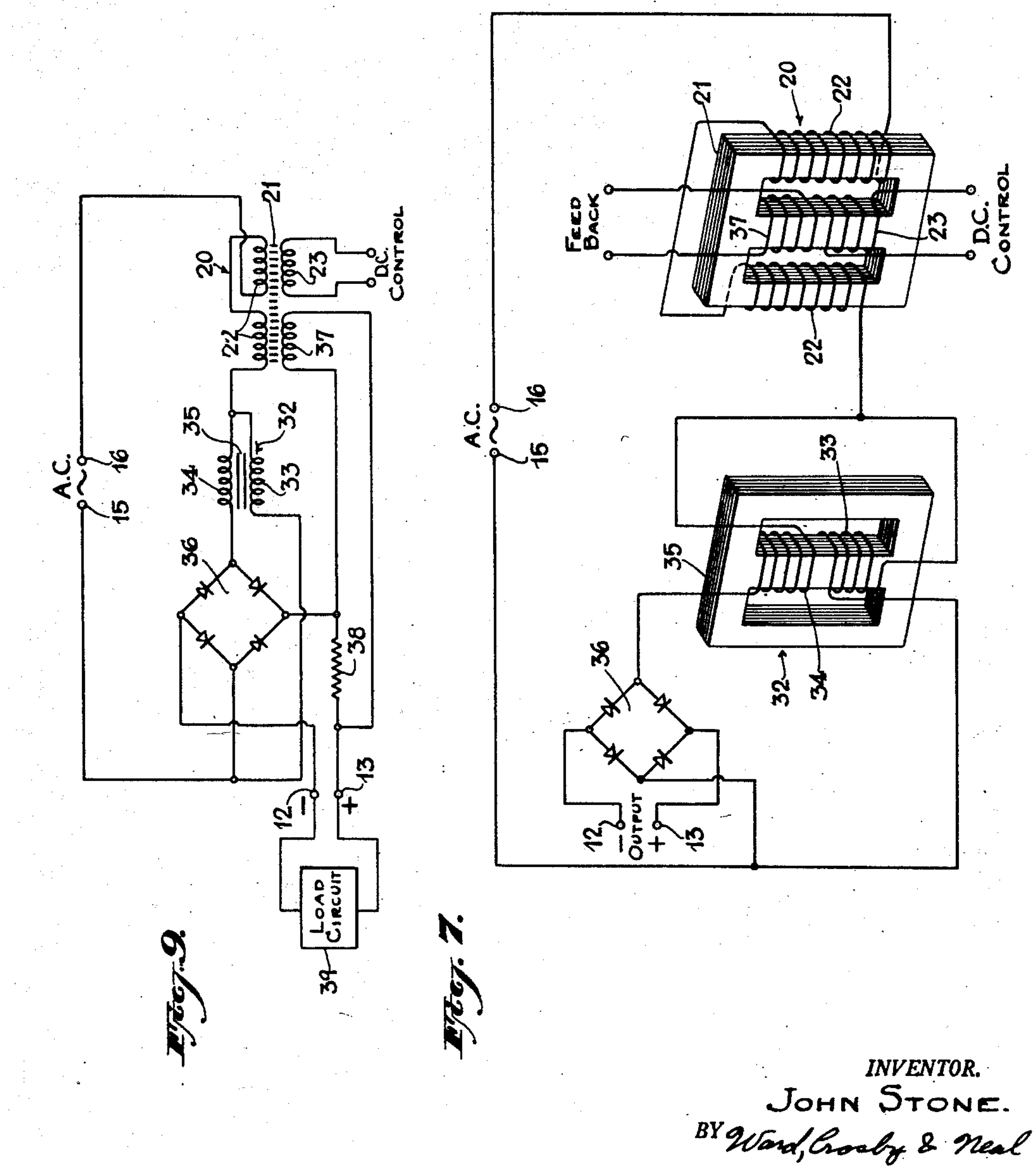
Fig. 7 illustrates a preferred form of the magnetic amplifier system and shows the components thereof partly in perspective and partly in schematic form.
Fig. 9 is a circuit diagram of a modified form of the magnetic amplifier system shown in Fig. 8 in which positive feedback is provided between the output circuit and the saturable core device.

Referring to Fig. 7 which illustrates a modification of the preferred embodiment of Fig. 6, it will be seen that the cores 21 and 35 of the saturable reactance device 20 and the transformer 32 have been illustrated in perspective and the windings on the cores have been shown schematically on various limbs of the cores. In addition to the elements shown in Fig. 6, the system of Fig. 7 includes a bridge rectifier 36 which is connected in series between the secondary winding 34 and the alternating current input terminal 15 and a portion of which is connected between the secondary winding 34 and the output terminals 12 and 13. The bridge rectifier 36 serves to rectify the alternating current flowing in the secondary winding 34 when the load circuit connected to the terminals 12 and 13 requires direct current for its energization.

In one embodiment of the invention, the transformer 32 comprised a core of silicon steel laminations .014" thick and having the configuration shown in Fig. 7. The laminations were of the type known as audio grade "A" and obtainable from the Allegheny Ludlum Company under the type No. EI-625. These laminations are hydrogen annealed after stamping and the core of the transformer 32 was formed by stacking the laminations in overlapping relationship until the thickness of the core was approximately ⅝ of an inch. The outside dimensions of the laminations were approximately 1⅞" by 1$^{9}/_{16}$", the center limb was approximately ⅝ of an inch wide and the outside limbs were approximately $^{5}/_{16}$ of an inch wide.

The windings 33 and 34 on the center limb of the transformer 32 were wound with hard drawn copper, 28 gauge wire with a plain enamel covering. The windings were wound on the center limb in the same direction with one winding on top of the other, and the layers of the windings were insulated from each other with impregnated paper in the usual manner. The primary winding 33 had 110 turns of wire and a resistance of 2.6 ohms and the secondary winding 34 had 150 turns of wire and a resistance of 3.07 ohms.

Figure 8:
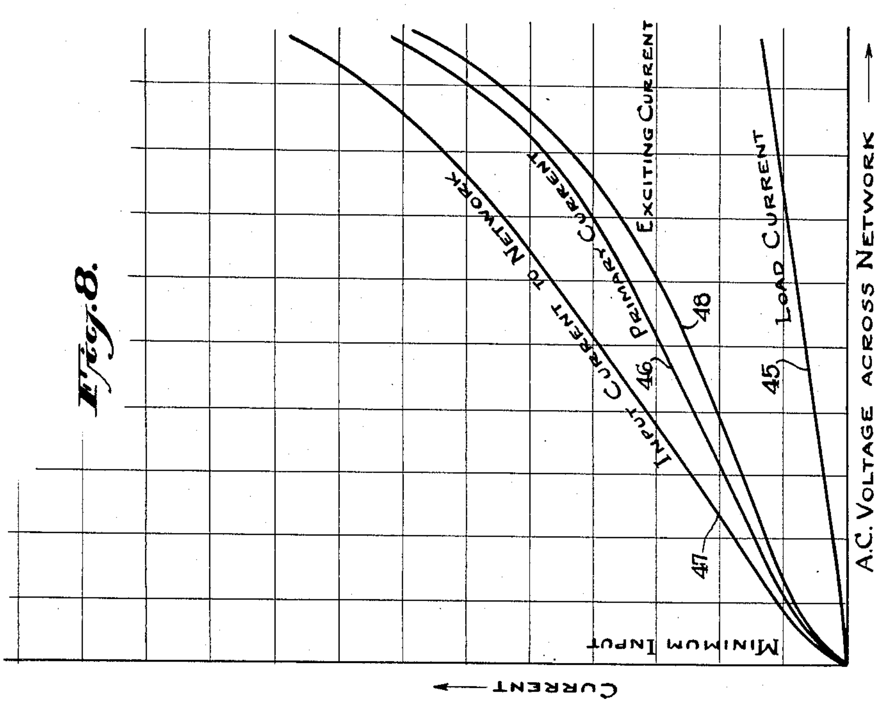
Fig. 8 is a graph used to illustrate the operation of the transformer shown in Fig. 7.

Fig. 8 is a graph of the operating characteristics of the circuit shown in Fig. 7 with a constant value of impedance connected across the output terminals 12 and 13 and indicates the variation of the currents in the various paths of the circuit with the variation of the alternating voltage applied to the network between the input terminal 15 and the junction point of the winding 33 with the winding 22. It will be seen that as the load current between the terminals 12 and 13 (curve 45) increases linearly, the current in the primary winding 33 (curve 46) increases rapidly at first and then increases rather slowly. The values of the voltages applied to the network and the impedances in the network are arranged so that the currents have the values indicated at the point designated "minumum input" on the curves when the control current in the winding 23 is zero. It will be seen that at this point, the current in the primary winding 33 is substantially equal to the input current to the network (curve 47), this input current being the same as the current through the reactance winding 22. However, as the input current to the network increases above the "minimum input" value, the primary current does not increase quite as rapidly, and the current in the primary winding 33 becomes a smaller proportion of the total input current to the network and hence, a smaller proportion of the current through the reactance winding 22. Thus, it will be seen that as the current through the reactance winding 22 increases, the current in the load circuit increases more rapidly than if the transformer 32 were omitted.

This action of the transformer 32 appears to be due to the variation of the exciting current of the transformer (curve 48) which it will be noted follows closely the current of the primary winding 33. In particular, it will be seen that as the voltage across the primary winding 33 of the transformer 32 is increased, the exciting current which is a large proportion of the network input current at low values does not change in proportion to the voltage across the primary winding 33, and, therefore, over the operating range of the amplifier system, the primary winding 33 presents an impedance which increases with the voltage across the winding.

A further improvement in the operation of the magnetic amplifier system can be obtained by employing the circuit arrangement of Fig. 9. In this figure, a feedback winding 37 (also shown in Fig. 7) of the saturable reactance device 20 is connected in parallel with a resistor 38 connected in series with a load circuit 39 connected to the output terminals 12 and 13. Thus, a portion of the current flowing in the load circuit 39 also flows through the feedback winding 37, and the direction of current flow and the turns of the winding 37 are arranged so as to produce a magnetic flux in the core 21 in a direction such that it aids the magnetic flux produced in the core 21 by the control winding 23. The feedback winding 37, therefore, produces feedback in a positive sense so that very small changes in the control current flowing in the winding 23 produce relatively large changes in the reactance of the winding 22. It has been found that such feedback greatly increases the gain which can be obtained with the amplifier system for a given power input.

Figure 10:
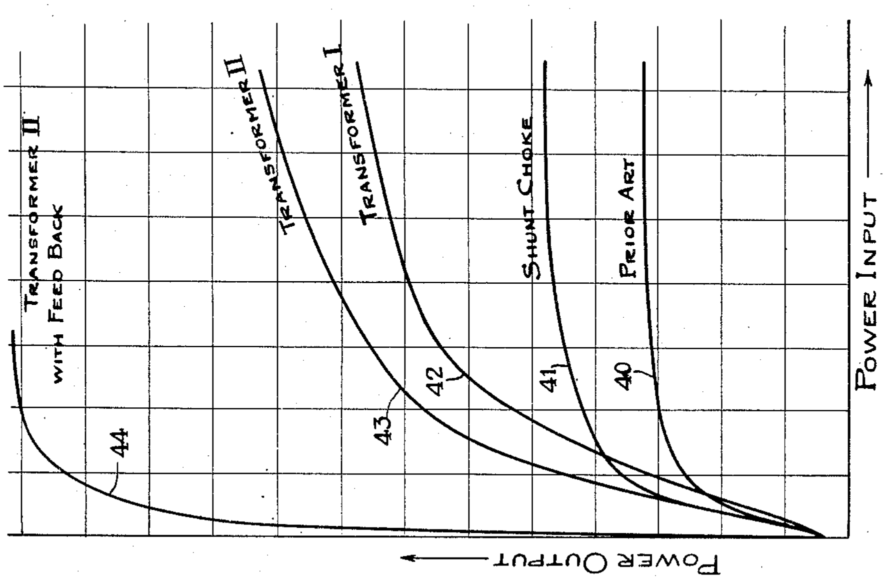
Fig. 10 is a graph illustrating the relative performance of the amplifier systems of my invention with respect to one circuit of the prior art.

Fig. 10 is a graph illustrating the improvement in gain and range of amplification which can be obtained with the magnetic amplifier system of my invention. The curves in Fig. 10 are drawn to the same scale and were prepared from comparative test data. In Fig. 10, curve 40 illustrates the operating characteristics of the circuit described in Patent No, 2,461,046, using a transformer constructed in accordance with the teachings of this patent, and curve 41 illustrates the operating characteristics of the circuit shown in Fig. 4.

With a transformer having the same core material but different primary and secondary turns from that used to obtain the data for curve 40 and connected as shown in Fig. 6, the operating characteristics of the type indicated by the curve 42 were obtained. If the core material of the reactance core 21 is changed to a relatively higher permeability, the gain and the amplification range can be further improved, as indicated by the curve 43. If, in addition to employing the last-mentioned transformer, the circuit of Fig. 9 is utilized, a much greater gain and greater amplification range, as illustrated by curve 44, is obtainable.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended hereto.

What is claimed as new and desired to be secured by Letters Patent of the United States is:

1. A magnetic amplifier comprising a variable reactance, a saturable device having an alternating current reactance winding having a predetermined current operating range and a direct current saturating winding, said reactance winding being connected in series with said variable reactance, means for energizing said series connected reactance winding and reactance with alternating current an adjustable direct current source connected to said saturating winding, means for simultaneously decreasing said reactance and adjusting said direct current in such a direction that the reactance of said reactance winding increases and an output circuit connected at one end to the junction point between one end of said reactance winding and said variable reactance and connected at its other end to the other end of said reactance winding.

2. A magnetic amplifier comprising: a variable reactance device, a transformer having primary and secondary windings, means connecting one end of said primary winding to said reactance device and connecting said primary winding and said device in series across an alternating current source, said primary winding presenting a predetermined impedance with a predetermined voltage applied thereto and presenting an impedance at least as great as said impedance with voltages greater than said predetermined voltage applied thereto, means connecting one end of said secondary winding to the junction point of said device and said end of said primary winding and an output circuit including said variable reactance device and said transformer secondary winding connected in series.

3. A magnetic amplifier comprising: a saturable core device having alternating and direct current windings, a transformer having primary and secondary windings, means connecting one end of said primary winding to said alternating current winding and connecting said primary winding and said alternating current winding in series across an alternating current source, said primary winding presenting a predetermined impedance with a predetermined voltage applied thereto and presenting an impedance at least as great as said impedance with voltages greater than said predetermined voltage applied thereto, means connecting one end of said secondary winding to the junction point of said alternating current winding and said end of said primary winding and an output circuit including in series said alternating current winding and said transformer secondary winding.

4. A magnetic amplifier comprising: a saturable core device having alternating and direct current windings, a transformer having primary and secondary windings, means for connecting said primary winding in series with said alternating current winding across an alternating current source, said primary winding presenting a predetermined impedance with a predetermined voltage applied thereto and presenting an impedance at least as great as said impedance with voltages greater than said predetermined voltage applied thereto, and an output circuit including in series said alternating current winding, said transformer secondary winding and a rectifier.

5. A magnetic amplifier comprising: a saturable core device having alternating and direct current windings, a transformer having primary and secondary windings, means for connecting said primary winding in series with said alternating current winding across an alternating current source, said primary winding presenting a predetermined impedance with a predetermined voltage applied thereto and presenting an impedance at least as great as said impedance with voltages greater than said predetermined voltage applied thereto, an output circuit including in series said alternating current winding, said transformer secondary winding and a rectifier and means for applying rectified current derived from said output circuit to a direct current winding on said saturable core device.

6. A magnetic amplifier comprising: a saturable core device having an alternating current reactance winding and a direct current saturating winding, a transformer having primary and secondary windings, means for connecting said primary winding in series with said reactance winding across an alternating current source, said primary winding presenting a predetermined impedance with a predetermined voltage applied thereto and presenting an impedance at least as great as said impedance with voltages greater than said predetermined voltage applied thereto, an output circuit including in series said reactance winding, said secondary winding and a rectifier and a coupling impedance common to the output of said rectifier and to said saturating winding.

7. A magnetic amplifier comprising: a saturable core device having an alternating current reactance winding and a plurality of direct current saturating windings, a transformer having primary and secondary windings, means for connecting said primary winding in series with said reactance winding across an alternating current source, said primary winding presenting a predetermined impedance with a predetermined voltage applied thereto and presenting an impedance at least as great as said impedance with voltages greater than said predetermined voltage applied thereto, an output circuit including in series said reactance winding, said secondary winding and a rectifier, and a circuit extending from the output of said rectifier to said saturable core device, said circuit including a direct current saturating winding thereof.

8. A magnetic amplifier comprising a pair of alternating current input terminals and a pair of output terminals; a transformer having primary and secondary windings, said primary winding having an impedance which increases with voltage applied thereto and being connected at one point to one of said input terminals and said secondary winding being connected at one point to one of said output terminals; a saturable core device having an alternating current reactance winding and a direct current saturating winding, said reactance winding being connected between the other of said input terminals and both another point on said primary winding and another point on said secondary winding; and means interconnecting the other of said input terminals with the other of said output terminals.

9. A magnetic amplifier comprising a pair of alternating current input terminals and a pair of output terminals; a transformer having primary and secondary windings, said primary winding having an impedance which increases with voltage applied thereto and being connected to one of said input terminals and said secondary winding being connected to one of said output terminals; a saturable core device having an alternating current reactance winding and a direct current saturating winding, said reactance winding being connected between the other of said input terminals and both the said primary winding and said secondary winding; and means interconnecting the other of said input terminals with the other of said output terminals.

10. A magnetic amplifier comprising a pair of alternating current input terminals and an output terminal, a transformer having primary and secondary windings, said primary winding having an impedance which increases with voltage applied thereto and being connected at one end to one of said input terminals and at the other end to one end of said secondary winding; a saturable core device having an alternating current reactance winding and a direct current saturating winding, said reactance winding being connected between the other of said input terminals and the junction point of said primary and secondary windings; and means interconnecting the other end of said secondary winding and said output terminal.

11. A magnetic amplifier comprising a pair of alternating current input terminals and an output terminal; a first saturable core device having an alternating current reactance winding and a plurality of direct current saturating windings, one end of said reactance winding being connected to one of said input terminals; a second saturable core device having an alternating current reactance winding and a direct current saturating winding, said last-mentioned reactance winding being connected between the other of said input terminals and the other end of said first-mentioned reactance windings; means interconnecting the junction point between said reactance windings and said output terminal; means for energizing one of the saturating windings of said first saturable core device with direct current; and means connecting another saturating winding of said first saturable core device in series with the saturating winding of said second saturable core device, said other saturating winding being connected so as to increase the reactance of said reactance winding of said first saturable core device with increases in direct current flowing in said other saturating winding.

12. A magnetic amplifier comprising a pair of alternating current input terminals and a pair of direct current output terminals; a transformer having primary and secondary windings, said primary winding having an impedance which increases with voltage applied thereto and being connected at one end to one of said input terminals; a saturable core device having an alternating current reactance winding and a direct current saturating winding, said reactance winding being connected between the other of said input terminals and both the other end of said primary winding and one end of said secondary winding; and a rectifier connected between the other end of said secondary winding and one of said output terminals.

13. A magnetic amplifier comprising a pair of alternating current input terminals and a pair of direct current output terminals; a transformer having primary and secondary windings, said primary winding having an impedance which increases with voltage applied thereto and being connected at one end to one of said input terminals; a saturable core device having an alternating current reactance winding and a direct current saturating winding, said reactance winding being connected between the other of said input terminals and both the other end of said primary winding and one end of said secondary winding; a bridge rectifier connected between said one input terminal and one of said output terminals and between the other end of said secondary winding and the other of said output terminals; and a pair of direct current input terminals connected to said saturating winding.

14. A magnetic amplifier comprising a pair of alternating current input terminals and a pair of direct current output terminals; a transformer having primary and secondary windings, said primary winding having an impedance which increases with voltage applied thereto and being connected at one end to one of said input terminals; a saturable core device having an alternating current reactance winding and a pair of direct current saturating windings, said reactance winding being connected between the other of said input terminals and both the other end of said primary winding and one end of said secondary winding; a bridge rectifier connected between said one input terminal and one of said output terminals and between the other end of said secondary winding and the other of said output terminals; an impedance connected between said rectifier and one of said output terminals; means connecting said last-mentioned impedance in parallel with one of said saturating windings; and a pair of direct current input terminals connected to the other of said saturating windings.

15. A magnetic amplifier comprising first and second saturable devices each having an alternating current reactance winding and a direct current saturating winding, said reactance windings being connected in series, means for energizing said series-connected reactance windings with alternating current, means for energizing the direct current saturating winding of said first device with direct current and means controlled by said last-mentioned means for supplying a direct current to the saturating winding of said second device, said last-mentioned saturating winding being connected so as to increase the reactance of the reactance winding of said second device with an increase of current flowing in said last-mentioned saturating winding, and an output circuit connected in parallel with said reactance windings of said second device.

References Cited in the file of this patent

UNITED STATES PATENTS

| Number | Name | Date |
|---|---|---|
| 2,047,915 | Logan | July 14, 1936 |
| 2,108,642 | Boardman | Feb. 15, 1938 |
| 2,247,983 | Barth | July 1, 1941 |

FOREIGN PATENTS

| Number | Country | Date |
|---|---|---|
| 615,786 | Germany | June 1935 |

OTHER REFERENCES

"Magnetic Amplifiers of the Balance Detector Type—Their Basic Principles, Characteristics, and Application." AIEE, December 1949.